United States Patent
Weldemariam et al.

(10) Patent No.: US 11,171,825 B2
(45) Date of Patent: Nov. 9, 2021

(54) CONTEXT-BASED RESOURCE ALLOCATION WITH EXTENDED USER CONCEPTS

(71) Applicant: International Business Machines Corporation, Armonk, NY (US)

(72) Inventors: Komminist S. Weldemariam, Nairobi (KE); Anup Kalia, Elmsford, NY (US); Jinho Hwang, Ossining, NY (US); Maja Vukovic, New York, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 15/973,675

(22) Filed: May 8, 2018

(65) Prior Publication Data
US 2019/0349251 A1 Nov. 14, 2019

(51) Int. Cl.
*H04L 12/24* (2006.01)
*H04L 29/08* (2006.01)

(52) U.S. Cl.
CPC .......... *H04L 41/0806* (2013.01); *H04L 41/16* (2013.01); *H04L 67/22* (2013.01)

(58) Field of Classification Search
CPC ..... H04L 41/0806; H04L 41/16; H04L 67/22; H04L 12/24; H04L 29/08; H04L 43/0876; H04L 41/14; H04L 67/306; H04L 41/5019; H04W 4/08; H04W 4/50
USPC ................ 709/220, 228; 340/16.1; 710/104; 713/1, 100; 717/11
See application file for complete search history.

(56) References Cited

U.S. PATENT DOCUMENTS

| | | | |
|---|---|---|---|
| 6,195,657 B1 | 2/2001 | Rucker et al. |
| 8,286,176 B1 | 10/2012 | Baumback et al. |
| 8,539,589 B2 | 9/2013 | Prafullchandra et al. |
| 9,311,070 B2 | 4/2016 | Bennah et al. |
| 9,348,650 B2 | 5/2016 | Bhogal et al. |
| 9,424,554 B2 | 8/2016 | Hayton et al. |

(Continued)

OTHER PUBLICATIONS

Bicknell, "Software Development and Configuration Management" IEEE 1988.

(Continued)

*Primary Examiner* — Tonia L Dollinger
*Assistant Examiner* — Mehulkumar J Shah
(74) *Attorney, Agent, or Firm* — Fleit Intellectual Property Law; Donna Flores

(57) ABSTRACT

Various embodiments provision resources of a large-scale enterprise network for a first user. The large-scale enterprise network has a multiplicity of resources and users. The actions of users of the network are monitored to determine resource usage history and current resource usage of all resources for each user. A resource usage frequency is determined for all resources used by the first user. A set of related users is created by identifying users grouped with the first user in a common user group. At least one resource usage configuration for the first user is predicted based on the resource usage history, current resource usage, and resource usage frequency of the first user and resource usage history and current usage of each of the related users. A computing device of the first user is provisioned according to the predicted resource usage configuration.

20 Claims, 7 Drawing Sheets

(56) References Cited

U.S. PATENT DOCUMENTS

| | | | |
|---|---|---|---|
| 9,426,030 | B1 | 8/2016 | Knerousis et al. |
| 9,497,136 | B1* | 11/2016 | Ramarao ............... G06F 9/5072 |
| 2011/0295999 | A1* | 12/2011 | Ferris .................... G06F 9/5072 |
| | | | 709/224 |
| 2014/0052683 | A1 | 2/2014 | Kirkham et al. |
| 2014/0195297 | A1* | 7/2014 | Abuelsaad ......... G06Q 10/0635 |
| | | | 705/7.28 |
| 2015/0106350 | A1 | 4/2015 | Cook et al. |
| 2015/0254560 | A1* | 9/2015 | Laredo ................... G06Q 10/04 |
| | | | 706/46 |
| 2016/0034840 | A1 | 2/2016 | Venanzi et al. |
| 2016/0092266 | A1* | 3/2016 | Bavishi ................ G06F 9/4856 |
| | | | 718/1 |
| 2017/0100674 | A1* | 4/2017 | Ntoulas ................... A63F 13/30 |
| 2017/0318083 | A1* | 11/2017 | Ignatyev ............. H04L 67/1023 |
| 2018/0248941 | A1* | 8/2018 | Naik ................... H04L 41/0896 |

OTHER PUBLICATIONS

Makris et al., "Dynamic and Adaptive Updates of NonQuiescent", EuroSys'07 Mar. 2007.

McCallum et al. "FACTORIE: Probabilistic Programming via Imperatively Defined Factor Graphs", http://alchemy.cs.washington.edu/papers/poon07 2007.

Nguyen et al., "Graph-based Mining of Multiple Object Usage Patterns" ESEC-FSE'09 Aug. 2009.

\* cited by examiner

`US 11,171,825 B2`

CONTEXT-BASED RESOURCE ALLOCATION WITH EXTENDED USER CONCEPTS

BACKGROUND

The present disclosure generally relates to resource allocation, and more particularly to automatic resource allocation based on context and extended user concepts.

Every business, enterprise and user group that communicate over cloud computing, such as an internet, must allocate available resources for its users whenever a new user enters the business or group, or periodically update to ensure that each user device is using an optimal configuration. Each user in the group is assigned certain resources, such as software, hardware, licenses, etc. These resources are constantly changing. Existing approaches to install, update and/or configure computing resources force a user to divide his or her attention between maintaining his/her resource repository and performing his/her actual work tasks. In addition, existing approaches do not leverage cognitive and social aspects of a user or personal preferences of that user.

SUMMARY

In various embodiments, a resource allocation system, a computer program product and a computer-implemented method for provisioning resources of a large-scale enterprise network for a first user of the large-scale enterprise are disclosed. The large-scale enterprise network has a multiplicity of resources and a multiplicity of users. The method comprises monitoring actions of users of the large-scale enterprise network to determine a resource usage history and a current resource usage of all resources of the multiplicity of resources in relation to each user; determining a resource usage frequency for all resources used by the first user; creating a set of related users by determining which users of the multiplicity of users are grouped with the first user in a common user group on the large-scale enterprise network or social network; predicting at least one resource usage configuration for the first user based on the resource usage history and a current resource usage of the first user, the resource usage frequency of the first user, and the resource usage history and a current resource usage of each of the related users; and provisioning a computing device of the first user according to the predicted resource usage configuration.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
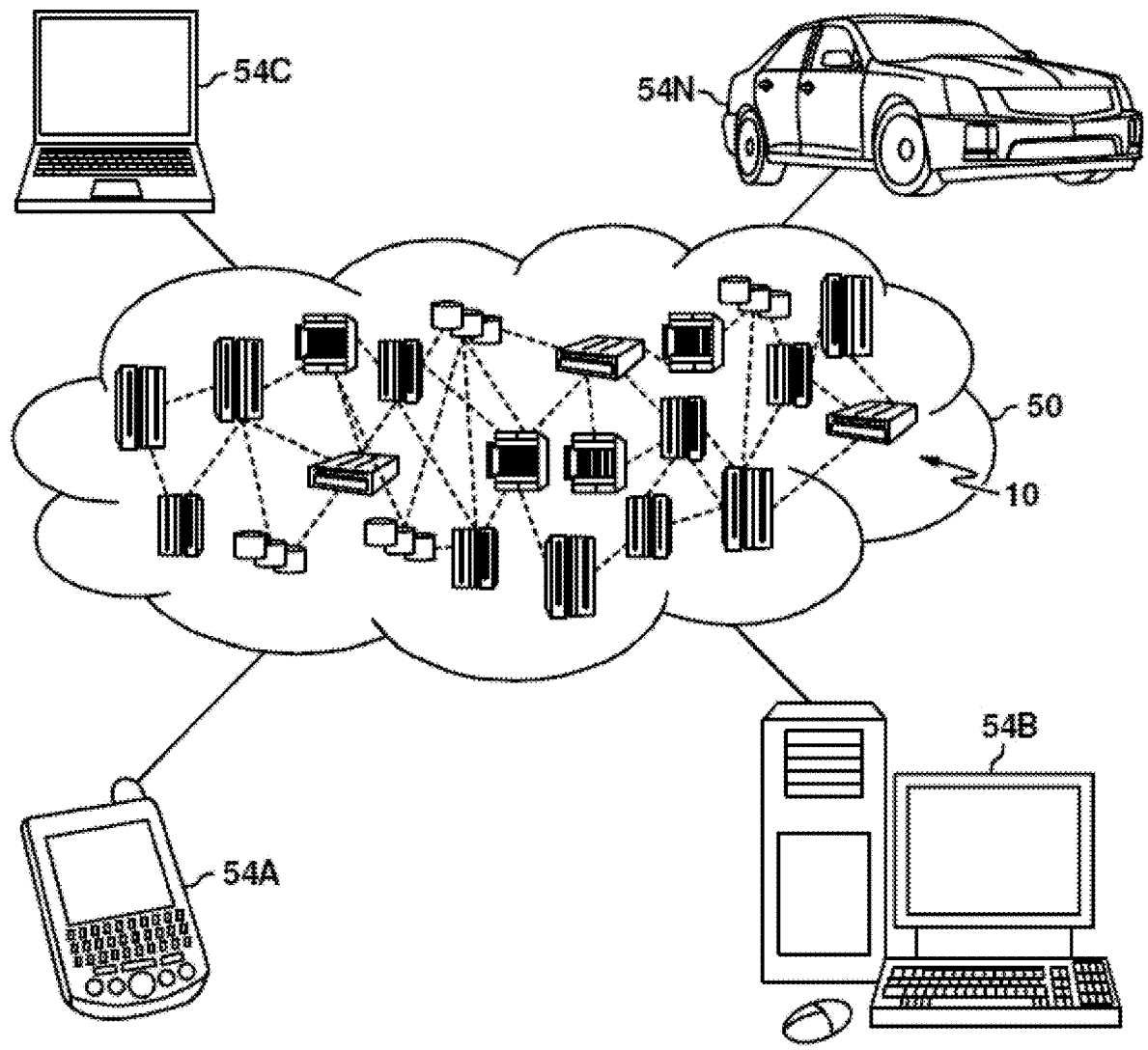
FIG. 1 depicts a cloud computing environment according to an embodiment of the present invention.

Embodiments of the present invention provide a resource allocation system and associated methods for allocating resources in a network. One embodiment discloses a method to predict usage patterns of a user's computing resources, including software applications, recommend an improved resource configuration for a user to accomplish his/her tasks, and configure the user's computer with the recommended resources. It should be noted that the terms "user" and "agent" are used interchangeably within the specification.

One embodiment discloses a system that employs one or more of a resource repository; functional and non-functional properties of available resources; a graph that captures relationships between resources, consumers, and capabilities; a social network (e.g., users' collaboration and group hierarchy); an expertise registry of "job roles", including a "cognitive feature" registry, with application to human and AI-agent users; and a method that predicts the improved usage of computing resources.

Unlike existing approaches, the embodiments disclosed herein leverage the cognitive and social aspect of a user, such as his/her routine resources usage patterns, group, and collaborations. In addition, the embodiments consider prediction of actions based on user's group or social network, as well as user bias to a specific resource usage. For example, a user using specific resources may not actually prefer using those particular resources, or a user not using certain resources does not necessarily mean that they have no interest in using them. The embodiments capture evolving needs of groups by taking into consideration blogs and social media content posted by users and groups from other companies Embodiments of the present invention take into consideration expected or predicted use of resources (with user activities) and contextual factors (e.g., predicted resource constraint such as network outage, power outage, memory/storage limitation) to recommends improved configurations of resources for existing users, new users, and groups In addition, embodiments provide an enhanced version of a Noise Tolerant Time-varying Factor Graph model that predicts computing resource consumption trends based on the knowledge of resources, user social networks, expertise, and usage history.

The embodiments allow for a class of "users" taking the form of Artificial Intelligence (AI) agents, usually in the form of software that actually use tools independently from human users or on behalf of human users. Such expert systems/features may also have "social networks" that include both human user or other AI agents. They may also have expertise, styles, cohorts, "talents," and abilities. Such agents may have software patches applied or that need to be applied to improve features, speed, efficiency, capability, and resiliency in the face of possible problems. Onboarding new AI agents into a group and for them to install a useful set of resources to "get started" is also enabled.

The embodiments may be applied to user "aliases" that consist of a set of users composed of AI agents and humans, working as teams. AI-agent "users" may learn and provide feedback to the resource allocation system, thus improving the ability of the overall system to recommend optimal configurations or reconfigurations for users to accomplish tasks.

Additionally, intelligent agent "users" may optionally set goals and achieve them. If the agent is not the only actor, it periodically ascertains whether the world matches its predictions, and it changes its plan, requiring the agent to reason under uncertainty. Multi-agent planning uses the cooperation and competition of many agents to achieve a given goal. Emergent behavior such as this is used by evolutionary algorithms and swarm intelligence.

Embodiments determine the temporal nature of the required resources resource per a user or per group, and based on that estimating, determine the duration D needed for the resource. User or group activities (or interaction with recommended resources) are monitored and tracked so that the system may intelligently recommend updating of a resource.

User-specified rules may be easily ingested via a Plug-and-Play interface (e.g., organizational rules as XML/JSON document, through a graphical user interface (GUI), etc.).

Cloud Computing

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Most embodiments of the present invention are intended to be performed on a private cloud system; however, it is within the scope of this invention that concepts may be extended to other forms of cloud systems.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices (referenced generally as computing devices 54) used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser), such as robots or other automated systems.

Figure 2:
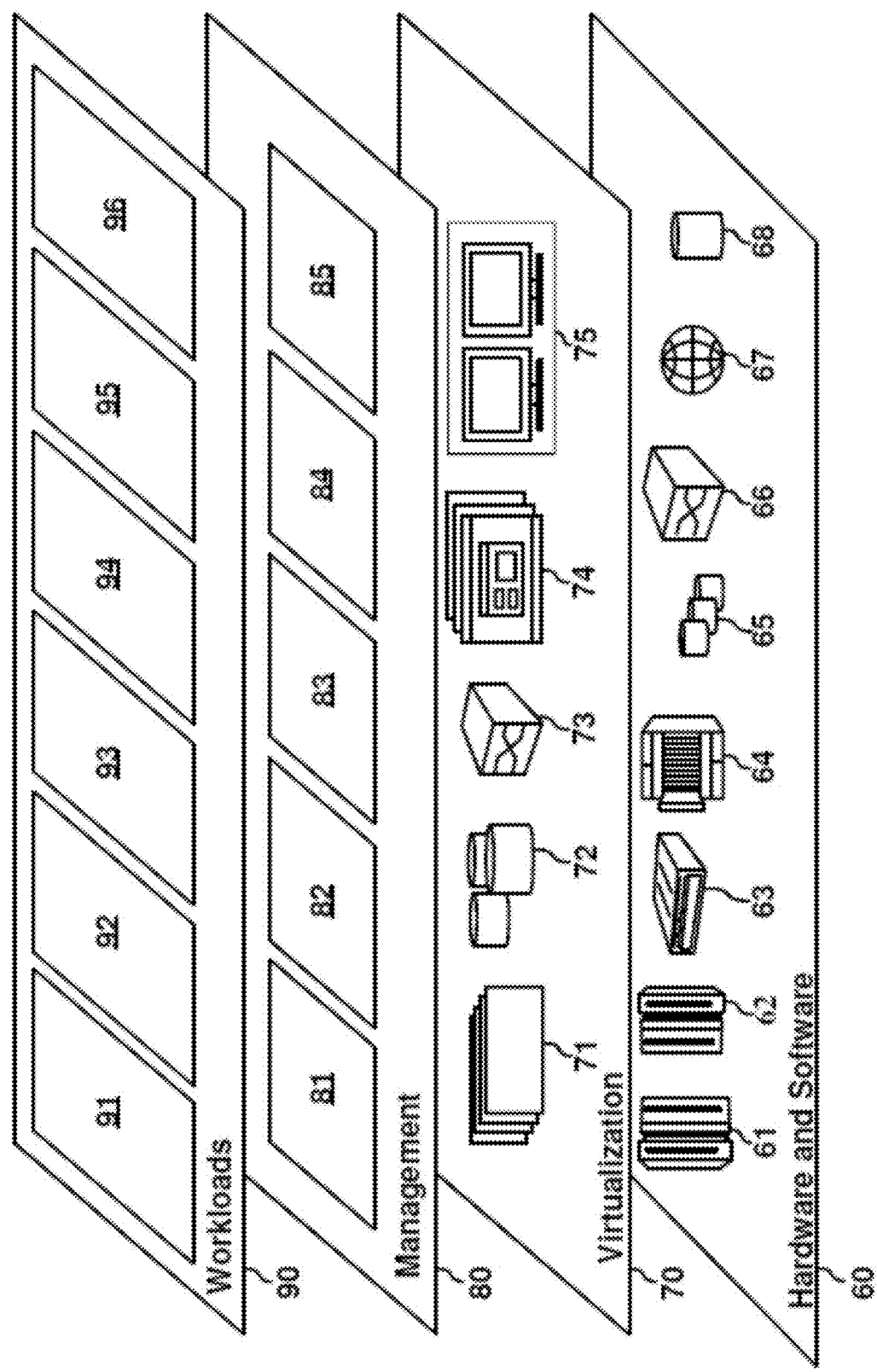
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a resource recommender 96. Resource recommender 96 works in coordination with resource provisioning 81 to allocate resources among the Classes of Users Users may include: humans, AI agents, composites that are composed of both AI agents and humans. In some cases, AI agents may be "coders" and assistants to humans. Users may have roles (including program debugging, designing, etc.) and certification levels and locations (globalization of resources).

Multi-agent systems consist of agents and their environment. Typically, multi-agent systems research refers to software agents. However, the agents in a multi-agent system could be robots, humans or human teams. A multi-agent system may contain combined human-agent teams.

Users may be passive agents or agent without goals, active agents with simple goals, or cognitive agents which contain complex calculations.

The agents in a multi-agent system may have autonomy (i.e. the agents are at least partially independent), local views (i.e. agents may not have a full global view of the system, or the system is too complex for an agent to make practical use of such knowledge), and decentralization (i.e. no designated controlling agent exists). The system may take into account these properties when recommending configurations, when onboarding multi-agent "users," when recommending that "users" update resource repositories, when recommending that a team to evolve to new resources based on task requirements, etc.

Figure 3:
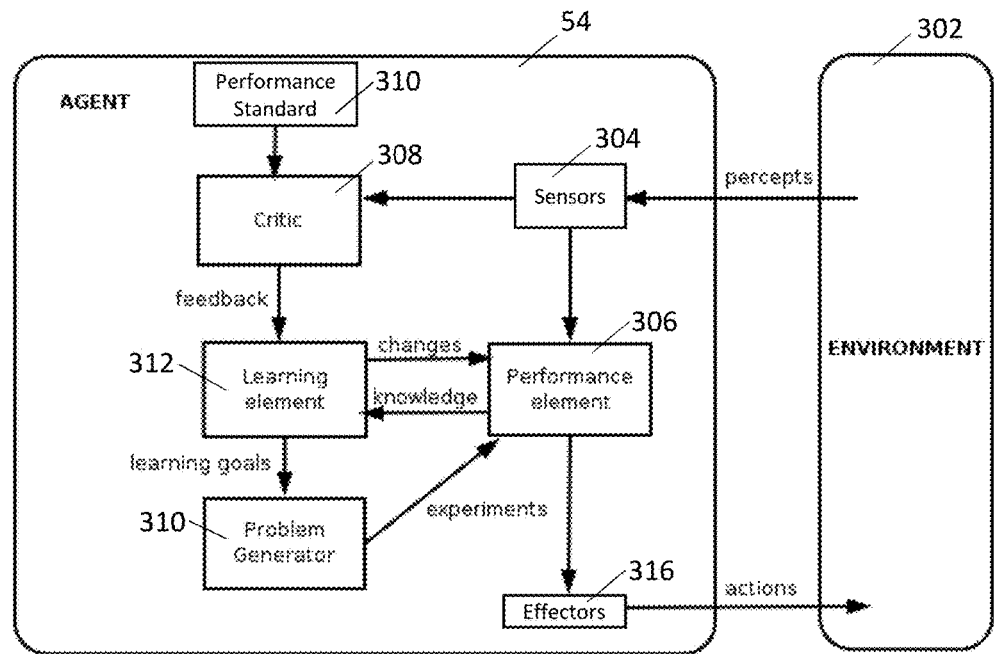
FIG. 3 is a block diagram illustrating one example of a learning agent for onboarding into a system according to one embodiment of the present invention.

FIG. 3 shows one example of a learning agent (i.e. computing device 54) which uses resources of computing system 50 in accordance with one embodiment. Computing device 54 is one of the "users" of computing system 50, which may need to be on-boarded to be part of a hybrid team and given access to improved resources. Computing device 54 comprises sensors 304, coupled with a performance element 306, a critic 308, a learning element 310, a problem generator 312, at least one performance standard 314 and effectors 316.

Computing device 54 interacts with the surrounding environment 302 via explicit means (e.g., application such as a social network application) or implicit means (e.g., sensors 304) to collect extended user contexts and receive perceptions of that environment 302 The environment 302 also provides social information. The social information includes organizational information, social network information, and so on to determine relationships in order to make the agent 54 decide how resources are provisioned in the cloud and help the agent 54 make decisions on future resource allocation. The sensors 304 collect, analyze and transfer information received or derived from instrumented inputs to a performance element 306 and a critic 308. The performance element 306 performs a specific task in response to an input from the sensors 304. However, the performance element 306 is also capable of learning based on feedback from the critic 308 and a learning element 310. The critic 308 compares information obtained by or derived from the sensors 304 with the at least one performance standard 314 and provides feedback to the learning element 310. The learning element 310 also sends learning goals to the problem generator 312 which provides experiments to be performed to the performance element 306. The learning element 310 also receives knowledge and/or results of each performed task from the performance element 306. If changes should be made to the performance element 306 based on the feedback from the critic 308, the learning element 312 provides those changes to the performance element 306. The performance element 306 sends any information that is to be expressed to the outside environment 302 to the effectors 316 (e.g., display, speaker, vibrator, heater, light, etc.) for implementation.

It should be noted that each component or sets of components of computing device 54 (e.g., sensors 304, performance element 306, critic 308, learning element 310, problem generator 312, performance standard 314 and effectors 316) may be considered as resources that may be subject to optimization.

Enterprise Usage

Figure 4:
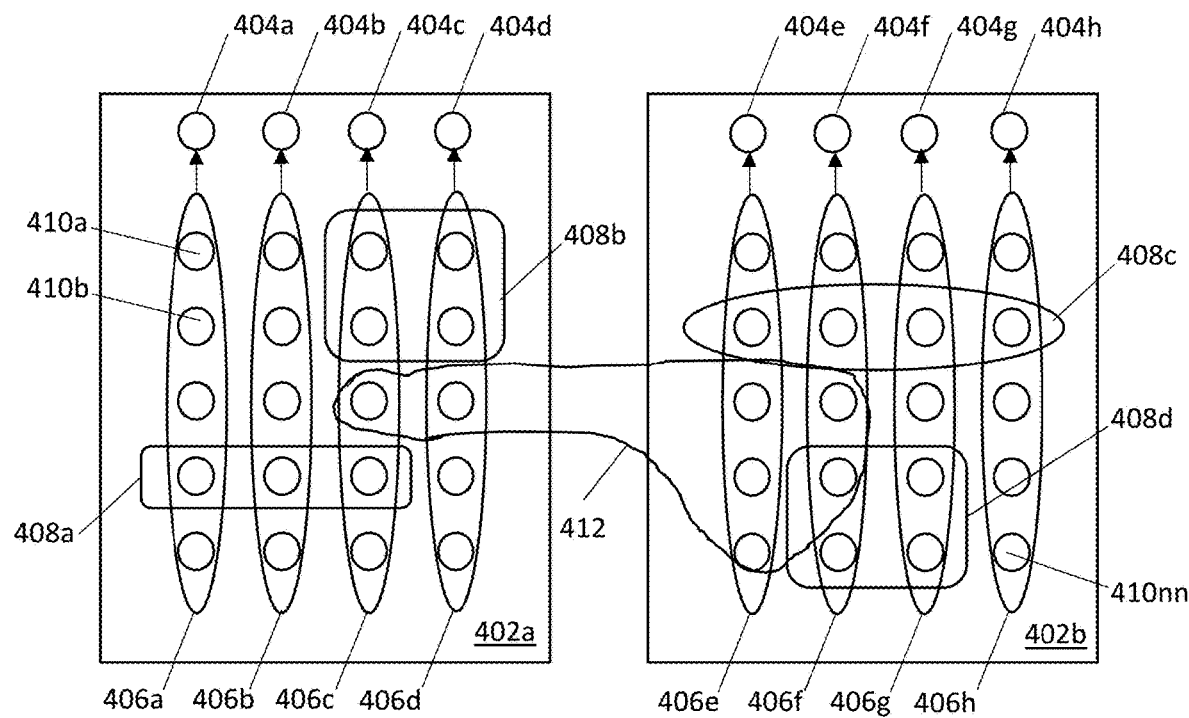
FIG. 4 is a block diagram illustrating one example of user relationships with different types of groups within an enterprise used in accordance with one embodiment of the present invention.

Referring now to FIG. 4, hierarchical chart 400 illustrating one example of user relationships with different types of groups within a large-scale enterprise used in accordance with one embodiment of the present invention is provided. A large-scale enterprise may employ hundreds to thousands of users where each user is assigned at least one computing device which must be configured and routinely updated. The example enterprise depicted in FIG. 4 comprises a plurality of divisions 402, managers 404, departments 406, user types 408, users 410 and hybrid groups 412. For purposes of clarity, two divisions 402a, 402b (referenced generally and collectively as "division 402") are shown. Each division 402 has multiple managers 404 (referenced generally and collectively as "manager 404") although the hierarchical chart 400 displays a total of four managers 404a . . . 404h each. Each manager 404 leads a department 406 (e.g., departments 406a . . . 406h shown). Each department 406 includes five users 410. It should be noted that user 410a, user 410b . . . user 410nn are the only users 410 labeled in FIG. 4 for clarity. Each department 406 may represent a user group with resource needs specific to that group. Additionally, users 410 may be grouped by user type 408 (user types 408a . . . 408d are shown) according to job description or role. For example, for a large technology company, user types may include hardware engineers, software engineers, mechanical engineers, administrators, designers, technical writers, etc. In addition, hybrid groups 412 comprising a variety of user types may be formed as needed (e.g., committees, etc.). Each user 410 may belong to a plurality of user groups, with each user group having its own recommended resources, thereby making the possible configurations of recommended resources practically limitless. It should be noted that the quantity of any entity portrayed in FIG. 4 is for illustrative purposes only and one of ordinary skill in the art should understand that the number of any item may vary and is not limited to the amount shown.

In other examples, the resource recommender 96 may actually create user groups 408 based on the types of resources users are running. Users 410 using similar resources may be combined to form a user group 408, thereby increasing the probability that these users will require similar resource configuration updates at a future time.

The resource recommender 96 reduces time to value in configuring new systems on demand as the user 410 overcomes manually searching for an optimal set of resources to perform his/her job and may be introduced to new resources not previously considered. In addition, the methods implemented by the resource recommender 96 reduces cost from unused computing resources, such as virtual machines (VMs), as current research indicates approximately 30% of servers in datacenters remain unused, needlessly consuming electricity without delivering any useful services. The resource recommender 96 further helps users 410 to keep updated with the individual entity's or group's needs, thereby, meeting the expectation of the individual entity or group.

Process Overview

Figure 5:
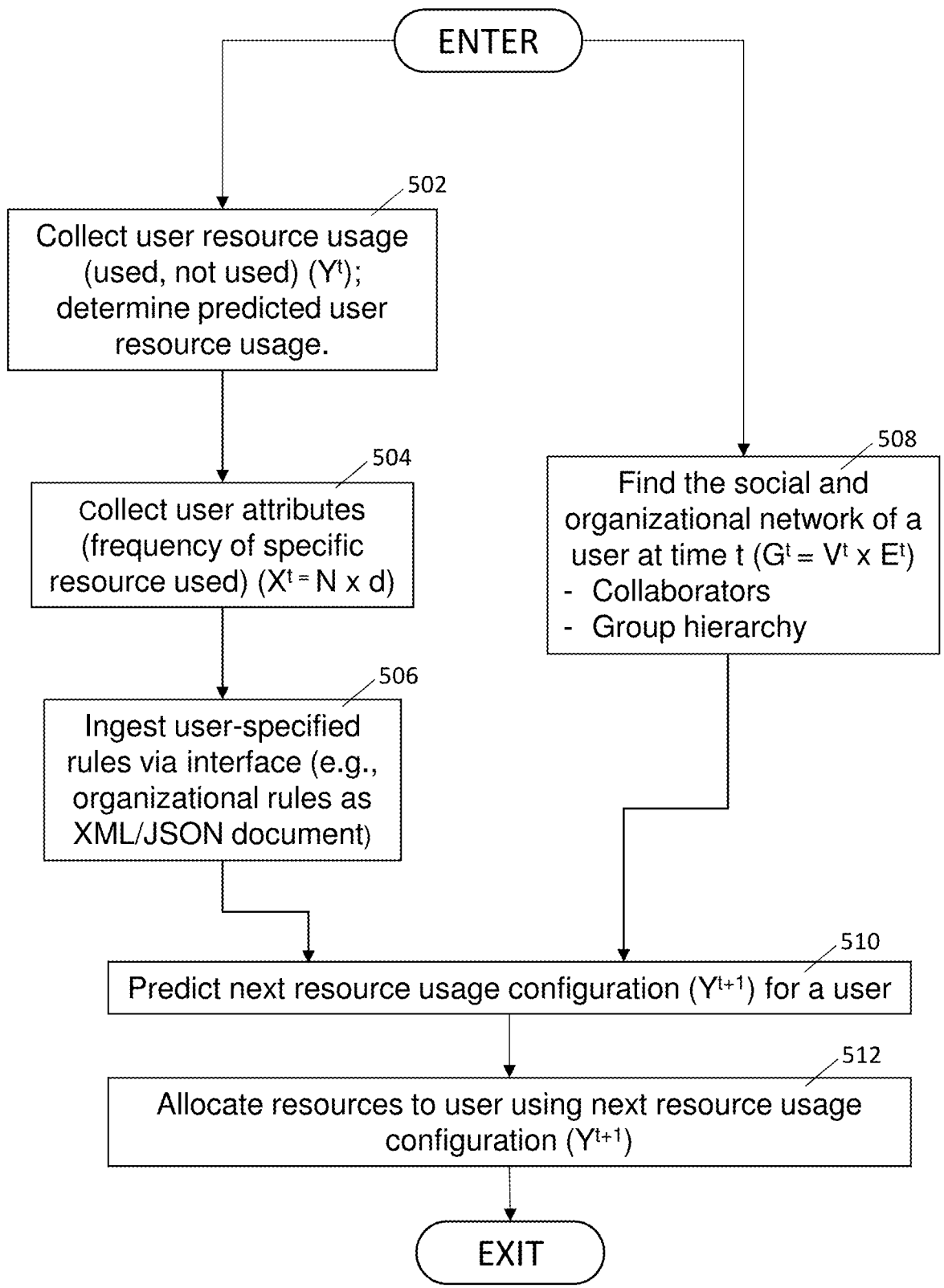
FIG. 5 is an operational flow diagram illustrating one process of allocating intranet resources according to one embodiment of the present invention.
Figure 6:
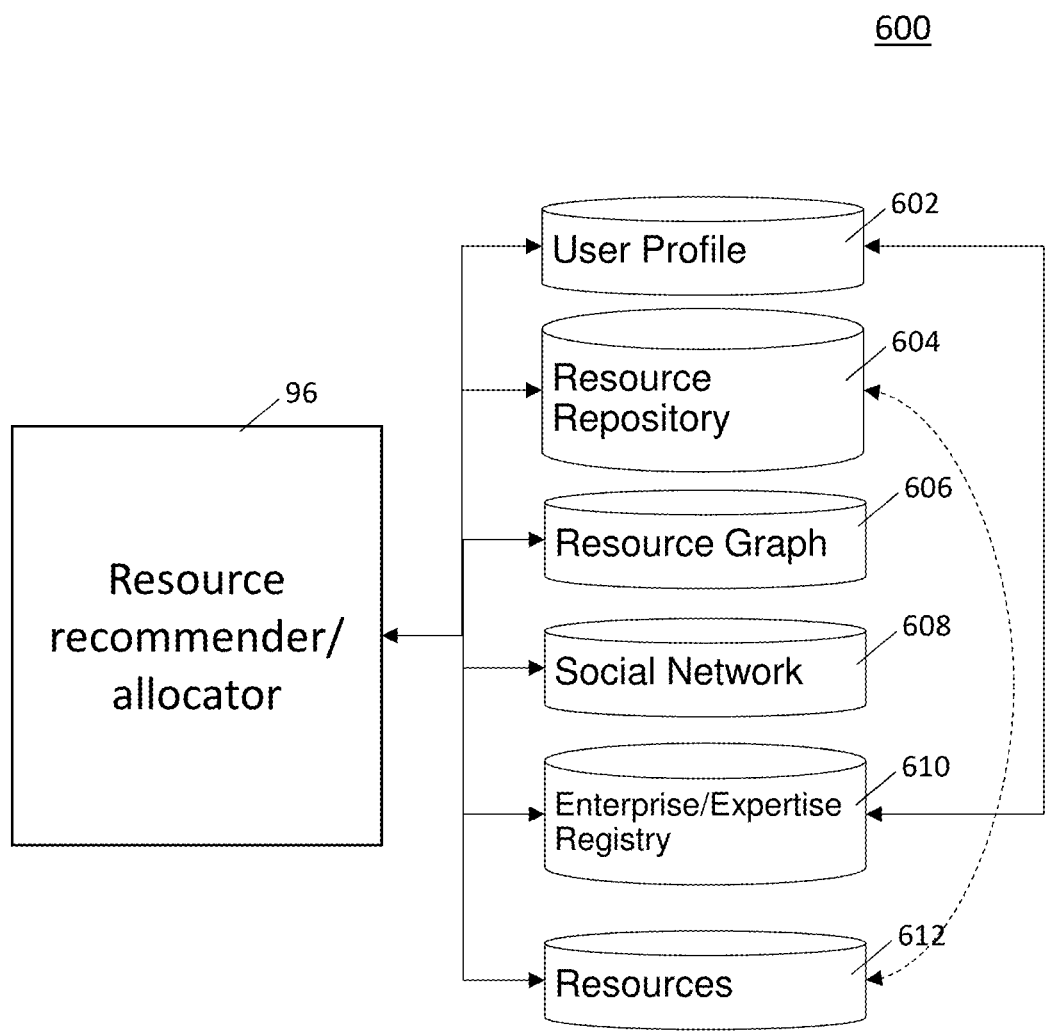
FIG. 6 is an operational flow diagram illustrating one process of allocating intranet resources along with associated resources according to one embodiment of the present invention.

Referring now to FIGS. 5 and 6, an operational flow diagram 500 illustrating one process of allocating network resources and an example resource allocation system 600, according to an embodiment of the present invention, are provided. In FIG. 5, characteristics and preferences of a user and the user's social and organizational network are processed in parallel and used to determine available resources and predict an optimal resource usage configuration for that user. The left branch of the operational flow diagram (i.e. steps 502 through 506) represents actions taken in reference to the user, while the right branch (i.e. step 508) represents actions taken to characterize the user's social and organizational network.

An enhanced version of a noise tolerant time-varying model (NTT++) is used to predict optimal resource usage configuration for users. In describing the formal model, an action of a particular user is referenced as:

$$\text{Action}(y, v_i, t) \tag{1}$$

where y is the resource usage at time t by a user $v_i$.
Thus, the history of all users is represented as:

$$Y = \{(y, v_i, t)\}_{i,t} \tag{1}$$

$y_i^t$ is selected from the set $y_i^t = \{0, 1\}$, representing whether or not the resource y is used by user $v_i$ at time t.

Referring back to FIG. 5, at step 502, user resource usage (i.e. used, not used) is collected for each resource for each user, determining the matrix Y, which will be used to determine the predicted user resource usage $Y^{t+1}$. The resource recommender 96 (also known as a "resource allocator") accesses the user profile 602 and the resource repository 604 to determine the user resource usage. The user profile 602 contains information about each user, such as name, department, job role, manager, etc. It should be noted that a user may be associated with multiple computing devices, but typically has a single user profile 602 that constitutes a plurality of user attributes. A listing of computing devices assigned to the user is included in the user profile 602. The resource repository 604 contains information concerning each resource, including whether or not the resource is currently being used by each user.

At step 504, user attributes are collected which indicate frequency of use for a specific resource to create a time-varying attribute $X^t$ representing an attribute matrix of size (N×d), where N corresponds to the number of users and d corresponds to attributes per user, at time t where each row $x_i$ corresponds to a user, and each column corresponds to an attribute user's resource usage frequency. Thus, the element $x_{i,j}$ is the jth attribute value of user $v_i$ and describes user specific characteristics. For example—attributes may be "worked with resource in the past 5 months", "in same org. chain", "retail expert", "accessed service s", "accessed pattern that uses s", "developed application that uses s", etc. Therefore, each resource may have multiple resource usage frequency attributes assigned for the same user. The frequency will impact the probability that a user will likely need to use the tool if there is a high frequency.

At step 506, user-specified rules are ingested via a Plug-and-Play interface. For example, organizational rules may be entered as an Extensible Markup Language (XML) document or a JavaScript Object Notation (JSON) document or directly through a GUI. These rules filter attributes based on the user profile and act as attributes computed from the environment to predict correct resource usage for a user. The rules can be considered as features. Their presence or absence determines the recommendations. For example, if the resource needs a license, but the organization does not approve that license, the resource will not be allocated. In addition, the rules may provide contextual factors (e.g., predicted resource constraint such as network outage, power outage, memory/storage limitation) which may be taken into consideration when providing the prediction.

At step 508, the organizational and social networking characteristics for each user is determined by monitoring the users' collaborators (i.e. other group members) and group hierarchy (for each group in which the user is a member). Relationships among users and resources used by each user are tracked by the resource graph 606. Relationships indicate which users are members of a same group and links between these users are used as an attribute in describing the network. Any user that is a member of a group in which the user is a member is a related user. It should be noted that certain users may be linked together in many different groups. This attribute augmented network is denoted as $$G=(V^t,E^t,X^t,Y^t), \quad (2)$$

where $V^t$=set of users, $E^t$=set of links between users at a time t, $X^t$=user attributes and $Y^t$=user resource usage. The attribute augmented network at a time t is a matrix of size $V^t \times E^t$. The user's relationship with other users in different groups is taken into consideration by G. For example, the user may be a member to social networks 608, such as internal web pages which provide insight and experience with specific topics related to the user's job function. The social networks 608 are typically within the enterprise but may potentially include blogs and social media from external corporations. Other users that subscribe to the same web pages may be considered a user group in which the user is a member. In addition, the enterprise/expertise registry 610 contains entries for each user along with corresponding attributes. The enterprise/expertise registry 610 may be viewed as an augmented collection of user profiles 602 for each user in the enterprise. The enterprise/expertise registry 610 may contain an enhanced matrix of attributes, for example, enterprise/expertise registry 610 may include projects that the user is working on, a history of former projects, current collaborators (i.e. other users working on the current project), former collaborators, resources for which the user has had experience, experience level, job function, etc.

A latent action state, $Z^t_i$, is used to evaluate the consistency of the user's network. $Z^t_i=\{0, 1\}$ for a combination of observed action $y_i$ and a possible bias (their interests or preference toward specific resource types at time t). $Z^t_i$ is used as an indicator to tell which resource types are relevant to users. Z represents information that indicates whether a user is inclined to use a resource or if a resource is relevant to user. The information is learned from current usage patterns of users. The information is not explicitly provided in the training data.

At step 510, the enhanced NTT++ model is used to predict the next resource usage configuration ($Y^{t+1}$) for a specific user. The goal of the NTT++ model is to learn a mapping function that maps, the network, the user's resource usage history, the resource usage history of other users and the links and/or relationships between the user and the other users in the network to the user's predicted resource usage in order to allocate an optimal set of resources to the user.

The mapping function allows the resource recommender 96 to predict the next configuration of resources (i.e. resource usage $Y^{t+1}$), or a set of possible configurations along with percentage possibility of use for a particular user. The NTT++ factor graph model is a time variant prediction that tells the next set of resources in the next time (e.g., next month). A user's resource usage at time t is influenced by their friends' or groups' historic resource usage ($G^T$ at time <t). Also, the user's resource usage at time t may be dependent on their own previous resource usage ($Y^T$ at time <t). Organizational rules govern resource assignment and use for a given resource and user/group cohort. For example, when a user advance in experience level, the organization's rules may dictate that they are now eligible for a hardware upgrade, such as a newer model laptop, additional monitors, etc.

At step 512, the predicted resource configuration ($Y^{t+1}$) is used to provision user computing devices with resources 612 allocated to the user. The provisioning may be performed automatically, without assistance of the user, or the system may inform the user of the predicted resource configuration so that the user may manually provision his/her computing device or provide permission to the resource allocator 96 to allow the resource allocator 96 to provision the computing device.

Use Cases

Three use case examples are described below:

Use Case 1: Recommending a User to Update or Optimize his/her Resource Repository As detailed above, to recommend a user update or optimize his/her resource repository, the resource recommender analyzes the user's resource usage patterns, mainly the resources the user is using frequently; analyzes the resources provided to the user's current resources; analyzes the resource usage patterns from the user's collaborators and group members; and predicts the resource(s) required for a user and group member (e.g., for collaboration) for a time period T resource usage.

Use Case 2: Recommending an Onboarding User to Install/Configure an Optimal Set of Resources As a new user has no previous history of resource usage (i.e. all instances of resource usage are null (0)), the resource recommendation will naturally be based on the user profile and resource usage history of other users in the user's social and organizational network with which the user has a relationship. To recommend an onboarding individual to install/configure an optimal set of resources, the resource recommender analyzes the resource usage patterns of a similar user with similar tasks and analyzes the resource usage patterns from the user's groups. This may imply a user cohort, with information regarding user cognitive/working style, including deficits and/or talents, etc. It should be noted that because users may also be AI agents, AI agents may be thought of us both users and potential resources, who may have need of other AI agents. Onboarding an AI agent into a team, as if the AI agent is a person, with a consideration of AI "talents, "networks" to other AI agents, and AI certification levels for the purpose of on-demand dynamic squad management may be automatically triggered when the AI agent connects to the enterprise network.

Use Case 3: Recommending a Group Evolve from Existing Resources to New Resources To recommend a group to evolve from existing resources to new resources, the resource recommender 96 analyzes the resource usage patterns of users from other companies from their blogs and social media. The use of external social media introduces potential new resources into the resource repository 504, thereby automatically alerting enterprise users of potential new tools, software, hardware, etc., that the user may not have previously been aware of. The resource recommender 96 further analyzes the resources usage patterns of other groups inside the company for similar tasks. Based on the data collected, the resource recommender 96 uses the NTT++ factor graph model to model user social network structure, user attributes (frequency of a specific resource usage), and user actions upon resources (used, not used) to generate users' future actions on resources. In addition, resource recommendation or prediction can be for temporary use, therefore the method may further determine a duration D corresponding to the recommended or predicted resource per a user or per group.

Figure 7:
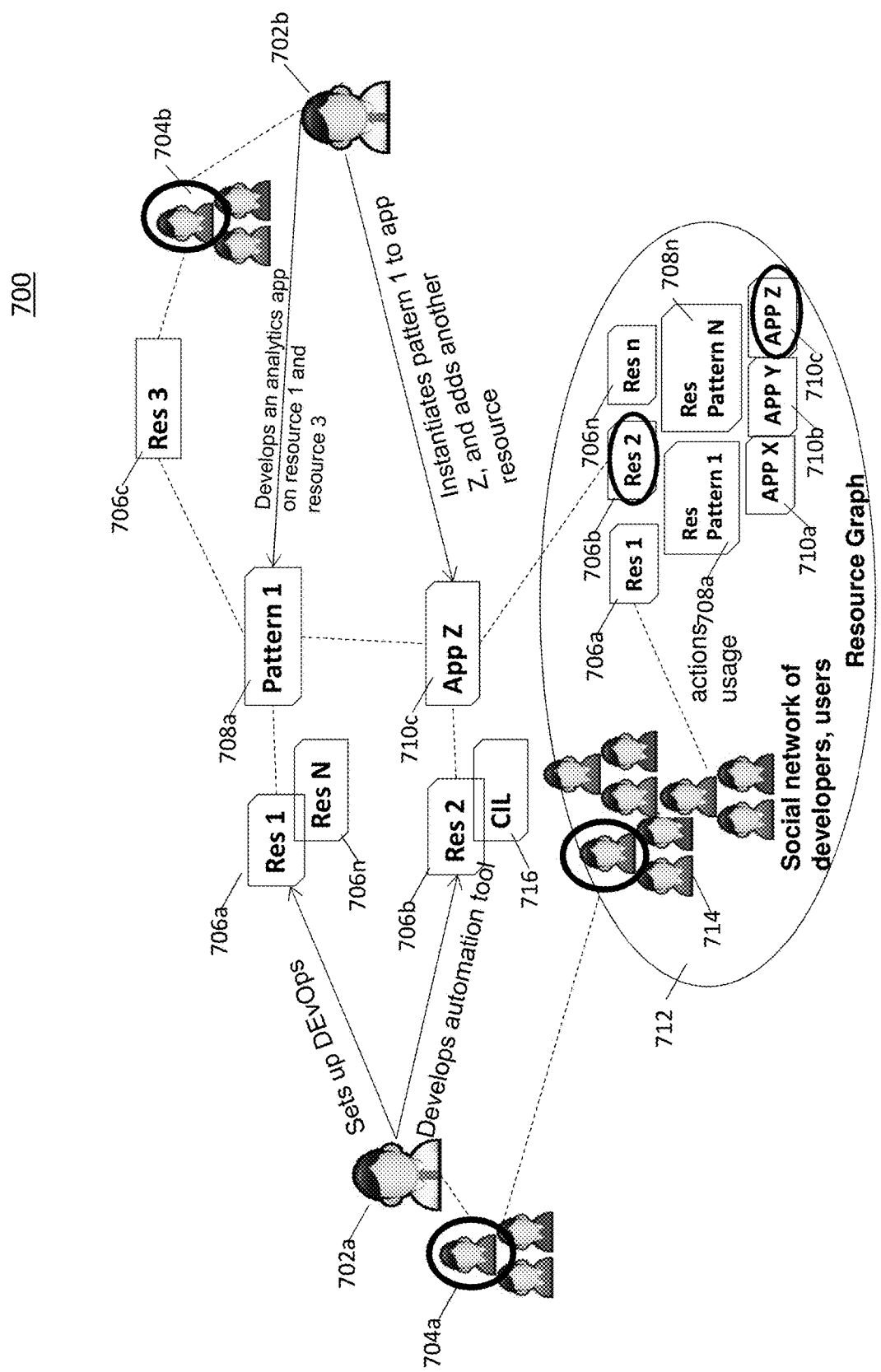
FIG. 7 is a diagram illustrating one example usage case of resource usage prediction according to one embodiment of the present invention.

Referring now to FIG. 7, a diagram is provided which illustrates one example usage case of resource usage prediction according to one embodiment of the present invention. Enterprise network 700 includes multiple users within an enterprise network, such as developer 702a who is a member of user group 704a and developer 702b who is a member of user group 704b, contributing to the optimization of enterprise resources by just using the resources (e.g., resource 706a, 706b, 706c, 706n; application 710a, 710b, 710c; pattern 708a, 708n; comments in-line 716) in their daily work. Developer 702a set up the development/operation (DevOps) pipeline (i.e. resource 706a) with resource definitions (e.g., server resource, application, tools, etc.), and other developers 702 define what kinds of resources are used specific to the applications (e.g., network ports, CPU, memory, disk, etc.). For example, developer 702a may further develop an automation tool (i.e. resource 706b, along with its comments in-line 716) and developer 702b may develop an analytics application on resource 706c and instantiate pattern 708a to application 710a. The relational information (e.g., organization, social relations, resource usage, etc.) is mapped to resource graph 712 to propagate the usage of resources and feed the information to an optimization algorithm to make predictions about the next resources. The actions of developers and operators are used to predict and recommend possible future actions. The resource graph 712 is informed by the organizational data, action history, resource configuration, interdependencies of application components and their deployment models and history.

Figure 8:
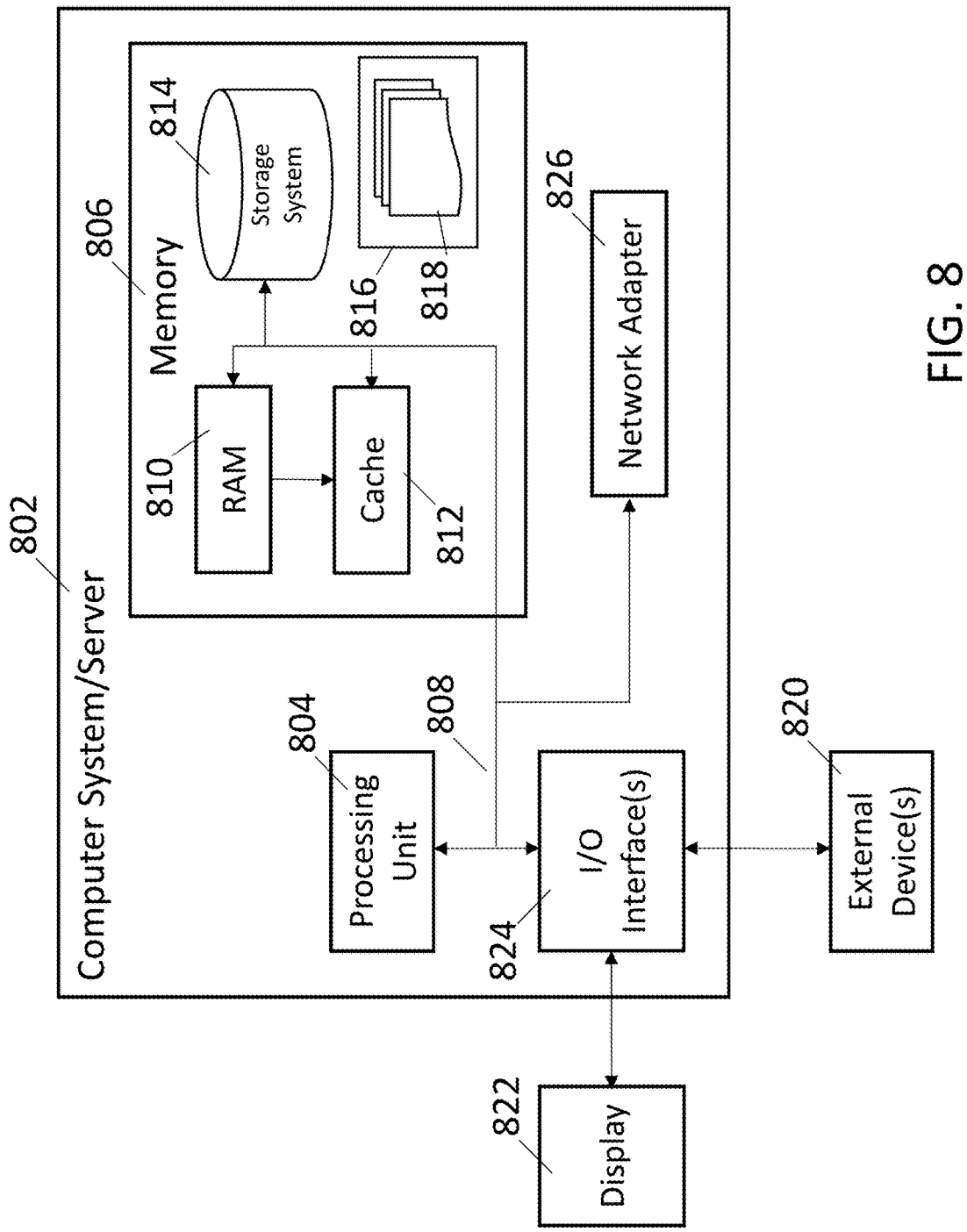
FIG. 8 is a block diagram of one example of a resource allocator according to one embodiment of the present invention.

Referring now to FIG. 8, this figure is a block diagram illustrating an information processing system 800 that can be utilized in embodiments of the present disclosure. The information processing system 800 is based upon a suitably configured computer processing system 802 configured to implement one or more embodiments of the present disclosure (e.g., resource recommender 96). Any suitably configured processing system can be used as the computer processing system 802 in embodiments of the present disclosure. The components of the computer processing system 802 can include, but are not limited to, one or more processors or processing units 804, a system memory 806, and a bus 808 that couples various system components including the system memory 806 to the processor 804.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 8, the main memory 806 may include the user profile 602, the resource repository 604, the resource graph 606, the enterprise/expertise registry 610 and other resources 612 shown in FIG. 6. One or more of these components 602, 604, 606, 610 and 612 can reside within the processor 804, or be a separate hardware component.

The system memory 806 can also include computer system readable media in the form of volatile memory, such as random access memory (RAM) 810 and/or cache memory 812. The computer processing system 802 can further include other removable/non-removable, volatile/non-volatile computer system storage media. By way of example only, a storage system 814 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 806 can include at least one program product having a set of program modules that are configured to carry out the functions of an embodiment of the present disclosure.

Program/utility 816, having a set of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the present disclosure.

The computer processing system 802 can also communicate with one or more external devices 820 such as a keyboard, a pointing device, a display 822, etc.; one or more devices that enable a user to interact with the computer processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. Other hardware and/or software components can also be used in conjunction with the information processing system 802. Examples include, but are not limited to: microcode, device drivers, redundant processing units, external disk drive arrays, RAID systems, tape drives, and data archival storage systems.

NON-LIMITING EMBODIMENTS

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for provisioning resources of a large-scale enterprise network for a first user of the large-scale enterprise, the large-scale enterprise network having a multiplicity of resources and a multiplicity of users, the method comprising:
monitoring actions of users of the large-scale enterprise network to determine a resource usage history and a current resource usage of all resources of the multiplicity of resources in relation to each user;
determining a resource usage frequency for all resources used by the first user;
creating a set of related users by determining which users of the multiplicity of users are grouped with the first user in a common user group on the large-scale enterprise network and grouped with the first user on a social network;
analyzing resource usage patterns of the related users;
using a latent action state to evaluate consistency of the set of related users to determine whether a user is inclined to use a resource;
recommending at least one new resource for use by the first user, along with a percentage possibility of use of the at least one new resource by the first user, based on the resource usage history and a current resource usage of the first user, the resource usage frequency of the first user, the resource usage history and a current resource usage of each of the related user and organizational rules; and
automatically provisioning a computing device of the first user with the new resource.

2. The computer-implemented method of claim 1, wherein predicting at least one resource usage configuration further uses a noise tolerant time-varying factor graph model (NTT++).

3. The computer-implemented method of claim 1, wherein the provisioning a computing device of the first user is performed automatically.

4. The computer-implemented method of claim 1, wherein the first user is one of a person, an artificial intelligence (AI) agent, a robot or a multi-agent team.

5. The computer-implemented method of claim 4, wherein the first user is an AI agent, the provisioning is performed automatically when the AI agent connects to the large-scale enterprise network.

6. The computer-implemented method of claim 1, wherein the social network is external to the large-scale enterprise network.

7. The computer-implemented method of claim 1, wherein predicting at least one resource usage configuration for the first user is further based on a set of user-specified organizational rules.

8. The computer-implemented method of claim 1, wherein the resource usage history and the current resource usage of the first user comprise a null set, the provisioning further comprises:
onboarding the first user into the large-scale enterprise network.

9. A resource allocation system for provisioning resources of a large-scale enterprise network for a first user of the large-scale enterprise, the large-scale enterprise network having a multiplicity of resources and a multiplicity of users, the resource allocation system comprising:
a computer in communication with the large-scale enterprise network, the computer comprising:
a processor; and
a memory, storing:
a resource repository including a resource usage history and a current resource usage of all resources of the multiplicity of resources in relation to each user;
a resource graph including a resource usage frequency for all resources used by the first user and a set of related users comprising users of the multiplicity of users that are grouped with the first user in a common user group on the large-scale enterprise network and grouped with the first user on a social network; and
a resource allocator that:
analyzes resource usage patterns of the related users;
uses a latent action state to evaluate consistency of the set of related users to determine whether a user is inclined to use a resource;
recommends at least one new resource for use by the first user, along with a percentage possibility of use of the at least one new resource by the first user, based on the resource usage history and a current resource usage of the first user, the resource usage frequency of the first user, and the resource usage history and a current resource usage of each of the related user and organizational rules; and
automatically provisions a computing device of the first user with the new resource.

10. The resource allocation system of claim 9, wherein the resource allocator provisions the computing device of the first user automatically.

11. The resource allocation system of claim 9, wherein the first user is one of a person, an artificial intelligence (AI) agent, a robot or a multi-agent team.

12. The resource allocation system of claim 11, wherein the first user is an AI agent, the resource allocator performs the provisioning automatically when the AI agent connects to the large-scale enterprise network.

13. The resource allocation system of claim 9, wherein the social network is external to the large-scale enterprise network.

14. The resource allocation system of claim 9, wherein predicting at least one resource usage configuration for the first user is further based on a set of user-specified organizational rules.

15. A computer program product for provisioning resources of a large-scale enterprise network for a first user of the large-scale enterprise, the large-scale enterprise network having a multiplicity of resources and a multiplicity of users, the computer program product comprising:
a non-transitory storage medium, readable by a processing circuit and storing instructions for execution by the processing circuit for performing a method comprising:
monitoring actions of users of the large-scale enterprise network to determine a resource usage history and a current resource usage of all resources of the multiplicity of resources in relation to each user;
determining a resource usage frequency for all resources used by the first user;
creating a set of related users by determining which users of the multiplicity of users are grouped with the first user in a common user group on the large-scale enterprise network and grouped with the first user on a social network;
analyzing resource usage patterns of the related users;
using a latent action state to evaluate consistency of the set of related users to determine whether a user is inclined to use a resource;
recommending at least one new resource for use by the first user, along with a percentage possibility of use of the at least one new resource by the first user, based on the resource usage history and a current resource usage of the first user, the resource usage frequency of the first user, the resource usage history and a current resource usage of each of the related user and organizational rules; and
automatically provisioning a computing device of the first user with the new resource.

16. The computer program product of claim 15, wherein the provisioning a computing device of the first user is performed automatically.

17. The computer program product of claim 15, wherein the first user is one of a person, an artificial intelligence (AI) agent, a robot or a multi-agent team.

18. The computer program product of claim 17, wherein the first user is an AI agent, the provisioning is performed automatically when the AI agent connects to the large-scale enterprise network.

19. The computer program product of claim 15, wherein predicting at least one resource usage configuration for the first user is further based on a set of user-specified organizational rules.

20. The computer program product of claim 15, wherein the resource usage history and the current resource usage of the first user comprise a null set, the method further comprises:

onboarding the first user into the large-scale enterprise network.

* * * * *